United States Patent [19]

Creusen et al.

[11] Patent Number: 5,348,652

[45] Date of Patent: Sep. 20, 1994

[54] SEMIPERMEABLE COMPOSITE MEMBRANE

[75] Inventors: Raymond J. M. Creusen, Amersfoort; Franky F. Vercauteren, Zeist, both of Netherlands

[73] Assignee: Nederlandse Organisatie Voor Toegepast-Natuurwetenschappelijk Onderzoek Tno, Delft, Netherlands

[21] Appl. No.: 955,737

[22] PCT Filed: Jun. 5, 1991

[86] PCT No.: PCT/NL91/00090

§ 371 Date: Dec. 3, 1992

§ 102(e) Date: Dec. 3, 1992

[87] PCT Pub. No.: WO91/18666

PCT Pub. Date: Dec. 12, 1991

[30] Foreign Application Priority Data

Jun. 6, 1990 [NL] Netherlands ................ 9001273

[51] Int. Cl.$^5$ ................................. B01D 61/18
[52] U.S. Cl. ................................. 210/490; 210/638
[58] Field of Search .............. 210/500.23, 500.42, 210/638, 490, 500.34, 500.35

[56] References Cited

U.S. PATENT DOCUMENTS 4,360,434 11/1982 Kawaguchi et al. .
4,769,148 9/1988 Fibiger et al. .

FOREIGN PATENT DOCUMENTS

0114286A2  6/1984  European Pat. Off. .
0220660    5/1987  European Pat. Off. .
3643574A1  6/1988  Fed. Rep. of Germany .
2189168A   10/1987 United Kingdom .

OTHER PUBLICATIONS

Patent Abstracts of Japan, vol. 13, No. 107, Publication No. 63-283707.

*Primary Examiner*—Frank Spear
*Attorney, Agent, or Firm*—Bachman & LaPointe

[57] ABSTRACT

The invention relates to semipermeable composite membranes having a high sucrose retention and a low salt retention, which membranes are composed of a porous support substrate and a polymer film applied thereon, which polymer film contains an ampholytic polymer. Said ampholytic polymer is entirely or partially made up of repeating units which contain at least one anionic and at least one cationic group. In this way a highly ordered distribution of the anionic and cationic groups over the ampholytic polymer is obtained, which apparently yields the good retention characteristics and reproducibility of the retention characteristics.

11 Claims, No Drawings

SEMIPERMEABLE COMPOSITE MEMBRANE

The invention relates to a semipermeable composite membrane having a high sucrose retention and a low salt retention, which membrane consists of a porous support substrate and a polymer film applied thereon, and also to a method for the production of such a composite membrane.

Diverse types of composite membranes for reverse osmosis and ultrafiltration are known from the prior art. For example, Netherlands Patent Application 8103550 describes a membrane having an increased resistance to oxidation and a high water permeability which is made up of a microporous substrate and a film applied thereon, said film being obtained by interfacial crosslinking of a polyvinyl alcohol and an amine containing at least two secondary amino groups per molecule, using a polyfunctional crosslinking agent which is able to react with the secondary amino groups and hydroxyl groups, and also an inner layer of a water-soluble polyvinyl alcohol, which layer is located between the porous substrate and the film. However, with regard to membranes of this type it is stated that, in addition to a very high sucrose retention of about 99%, the retention for magnesium sulphate is more than about 90% and for sodium chloride is substantial at a strongly increased operating pressure.

U.S. Pat. No. 4,769,148 relates to a polyamide membrane for use in reverse osmosis, which membrane is produced by using a cationic polymer wetting agent in an aqueous solution containing a polyfunctional amino reagent, which is polymerised interfacially using an acyl halide with the formation of a thin film on a microporous support. The polymer wetting agent contains a multiplicity of onium groups, such as, preferably, sulphonium and quaternary ammonium groups. It has been found that the membranes described in this U.S. Pat. No. 4,769,148 have a retention for magnesium sulphate of more than about 90% and according to the examples the NaCl retention thereof is virtually always substantial, that is to say >50%.

In European Patent Application 313,354 a composite membrane for use in reverse osmosis is described which is formed by interfacial polymerisation, on a surface of a microporous support, of a water-soluble polyfunctional aliphatic primary amine and a water-soluble polyfunctional secondary amine with a polyfunctional acyl halide, preferably having a functionality of >2.05. This membrane was prepared using a molar ratio of the primary amino component to the secondary amino component of less than 1:5. Membranes in accordance with this European patent application can be used for the demineralisation of cheese whey and for the treatment of the effluent from a yeast culture. It can be seen from the examples that the lactose retention is usually more than about 93%. It is also stated in the text of said European Patent Application 313,354 that only 0.6% of the sulphate can pass through the membrane.

Furthermore, EP-A 0,114,286 relates to a semipermeable composite membrane which is made up of a porous polymer substrate with a thin semipermeable film applied thereon, which film covers both the external surface and the internal pore surface. This semipermeable film consists of at least one layer, and advantageously two to three layers, of a crosslinkable hydrophilic polymer which is crosslinked with at least one polyfunctional compound having at least two functional groups.

According to EP-A-0,114,286 it is possible for the polymer film to contain both anionic and cationic groups. However, it is pointed out in respect of the polymer films according to said EP-A that the distribution of the anionic and cationic groups over the polymer film is "random", which in the experience of the Applicant leads to a poor reproducibility of the test results obtained; this aspect is illustrated in Comparative Example 2 below.

The production method for the composite membrane according to EP-A 0,114,286 is also regarded as being fairly laborious. In order to coat the substrate and the wall of the pores thereof, the substrate usually has to be subjected several times to the following series of treatments:

a) immersion of the substrate in a polymer solution;
b) rinsing off of the excess polymer solution;
c) crosslinking of polymer adsorbed on the substrate using a crosslinking agent; and
d) rinsing off of the excess crosslinking agent.

U.S. Pat. No. 4,360,434 describes a number of interfacially formed composite membranes which are amphoteric, that is to say said membranes possess both a cationic and an anionic functionality. Said membranes were produced by the use of polymer amines containing both reactive and non-reactive amino groups; amines of this type provide the cationic sites in the membrane. The crosslinking agents used were trifunctional or tetrafunctional acyl halides. Hydrolysis of some of the acyl groups provided the anionic sites in the membrane. More particularly, the polymer amines used were compounds containing active amino groups, such as, for example, primary and secondary amino groups, and non-active amino groups, such as tertiary amino groups and/or ammonium salt groups. Partially ionised polyethylenimine, that is to say some of the amino groups present therein have been neutralised with hydrogen chloride, is mentioned as an example of a polymer amine considered suitable. The amino groups neutralised in this way do not react with the acyl halides used as interfacial crosslinking reagents. Some of the amino groups of the polyethylenimine can also be converted by means of a quaternisation to ammonium groups which then provide the cationic sites in the membrane. According to this patent, the crosslinking reagents used were advantageously trimesoyl chloride, 5-chlorosulphonylisophthaloyl chloride and pyromellitic acid chloride. The membranes obtained usually had a low NaCl retention (<30%) and a high sucrose retention (>90%).

Furthermore, British Patent Application 2,189,168 discloses interfacially produced composite membranes which are suitable for the separation of organic compounds having a low molecular weight, such as sucrose, from aqueous solutions of inorganic salts. These composite membranes can be prepared as follows by:

(a) coating a microporous membrane support on one side with an aqueous solution of, in particular, a polyamine such as a polyethylenimine, a crosslinking agent (1) and, optionally, monomer compounds containing anionic and sometimes containing cationic charge carriers, with the formation of a polymer layer (1);

(b) bringing the still moist layer into interfacial contact with an organic solution of a crosslinking agent (2) containing at least two functional groups, such as trimesoyl chloride;

(c) drying the composite membrane which possesses ionic groups at the surface of the top layer; and (d) if appropriate treating the membrane obtained under (c) with an aqueous solution of a crosslinking agent (3) which is able to react with the polymer and/or the unconverted groups of the monomer, at least the polymer, the monomer or the crosslinking agents containing 1–3 anionic groups or groups which are convertible to anionic groups.

For illustration, it is stated specifically in the examples (Example I) and claim 25 that the layer concerned is an anionic top layer, which rests on a cationic (or amphoteric) intermediate layer, which adjoins the microporous membrane support.

The membranes according to said British Patent Application 2,189,168 have a high retention for the organic substance used as test compound and fluctuating retentions, which are assessed as inadequately low, for NaCl and sodium sulphate, as can be seen from Tables 1 and 2 of this British patent application.

The aim of the invention is, now, to provide semipermeable composite membranes which have a high retention for organic substances having a molecular weight of >150, such as sucrose, and a low retention for both monovalent salts such as NaCl and polyvalent salts such as sodium sulphate.

The aim of the invention can be achieved by the provision of composite membranes which consist of a microporous support having a polymer film applied thereon, the polymer film also containing an ampholytic polymer which comprises repeating units containing at least one anionic and at least one cationic group. "Repeating" units are understood to be units in the ampholytic polymer which are derived either from a monomer containing both at least one anionic and at least one cationic group or from two monomers, one of which contains at least one anionic group and the other of which contains a cationic group, or from polymer fragments which after the polymerisation are provided with the anionic and/or cationic group(s). As a result of this, the membranes according to the invention—in contrast to such composite membranes known from the prior art discussed above—have a highly ordered distribution of the cationic and anionic groups in the ampholytic polymer.

More particularly, ampholytic polymers which can be used are diverse types of polymers having anionic and cationic groups. Ampholytic polymers of this type, which can have an $M_w$ of, for example, 10,000–10,000,000, preferably 20,000–500,000, can be used as a component of the aqueous solution in which the polyamine is present. Quaternary ammonium and sulphonium groups may advantageously be mentioned as examples of cationic groups and carboxylate and sulphonate groups may advantageously be mentioned as examples of anionic groups.

The ampholytic polymers which can be used in the invention can contain repeating units which are derived from monomers containing both at least one anionic and at least one cationic group. Such units are advantageously of the sulphobetaine or of the carboxybetaine type. Preferably, the repeating units of the sulphobetaine type are derived in particular from the inner salt of a vinyl-(sulpho-R-)imidazolium hydroxide or vinyl-(sulpho-R-)pyridinium hydroxide, in which R represents a $C_{3-4}$ alkyl group or benzyl group. Examples of these units of the sulphobetaine and the carboxybetaine type are the inner salts of 1-vinyl-3-(3-sulphopropyl)imidazolium hydroxide
1-vinyl-2-methyl-3-(3-sulphopropyl)imidazolium hydroxide
1-vinyl-3-(4-sulphobutyl)imidazolium hydroxide
1-vinyl-2-methyl-3-(4-sulphobutyl)imidazolium hydroxide
1-vinyl-3-(2-sulphobenzyl)imidazolium hydroxide
2-vinyl-1-(3-sulphopropyl)pyridinium hydroxide
2-methyl-5-vinyl-1-(3-sulphopropyl)pyridinium hydroxide
4-vinyl-1-(3-sulphopropyl)pyridinium hydroxide
dimethyl-(2-methacryloxyethyl)(3-sulphopropyl)ammonium hydroxide
diethyl-(2-methacryloyloxyethoxy-2-ethyl)(3-sulphopropyl)ammonium hydroxide
4-vinyl-N-(4-sulphobutyl)pyridinium hydroxide
2-vinyl-N-(4-sulphobutyl)pyridinium hydroxide
N-(3-sulphopropyl)-N-methacrylamidopropyl-N,N-dimethylammonium betaine
N-(3-carboxypropyl)-N-methacrylamidoethyl-N,N-dimethylammonium betaine
4-vinylpiperidinium methanecarboxybetaine and of
4-vinylpyridinium methanecarboxybetaine.

The abovementioned betaine units are listed, for example, in the *Encyclopaedia of Polymer Science and Engineering*, 2nd Ed. (1988), Vol. 11, pp. 514–530.

The following may be mentioned as examples of other ampholytic polymers containing repeating units which contain both a quaternary ammonium group as cationic group and a carboxylate or sulphonate group as anionic group: the polymers containing units of formula (1), (2), (3) and (4)

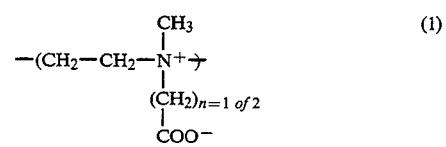

(1)

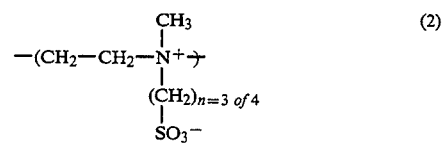

(2)

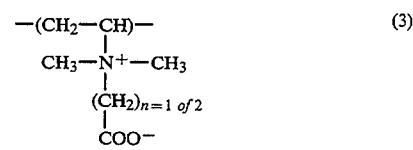

(3)

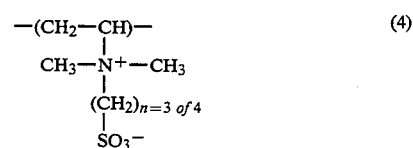

(4)

More particularly, ampholytic polymers which can be used according to the invention can be made up entirely or in part of units which are represented by the formula (5) below:

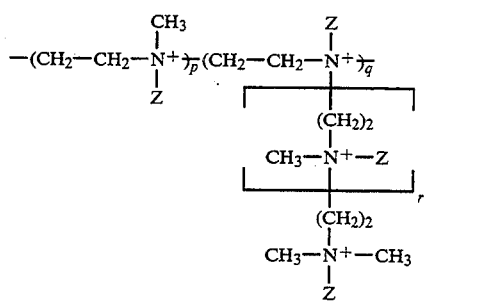

(5)

in which Z=H, —CH$_2$COO—, —(CH$_2$)$_2$COO—, —(CH$_2$)$_3$SO$_3$— and/or —(CH$_2$)$_4$SO$_3$—, on condition that not all Z=H and the sum of p+r+2q=1, the sum of p+r=0.5–1 and 2q=0.5–0.

Examples of ampholytic polymers are, therefore, for example polyethylenimines (molar weight of 30,000–100,000) which are completely methylated and may or may not be completely carboxymethylated. A methylation or carboxymethylation of this type can be carried out in accordance with the method described below. The carboxymethylation can be carried out to the extent of 50–100 mol %, preferably 75–95 mol %. The description below is given to illustrate these two reaction steps.

A) Methylation 100 parts by weight of a 50% by weight polyethylenimine solution (molar mass 30,000–100,000) in water (Janssen, Belgium) were mixed with 488 parts by weight of 98% formic acid and 103.9 parts by weight of a 35% formaldehyde solution. This mixture was kept under nitrogen at 110° C. for 40 hours. After cooling, the solution was rendered highly basic (pH=about 13) using a 1M NaOH solution, dialysed until the wash water remained neutral, evaporated and freeze-dried. The degree of methylation was found to be complete on the basis of element analysis.

B) Carboxymethylation

A solution of sodium bromoacetate was prepared by adding a solution of 43.5 parts by weight of NaOH in 100 parts by weight of demiwater (deminerslised water) at 0° C. in the course of about one hour to a solution of 150 parts by weight of bromoacetic acid in 75 parts by weight of demiwater. This solution was added to a solution of 35 parts by weight of methylsted polyethylenimine (obtained from step A) in 200 parts by weight of methanol and 200 parts by weight of demiwater at 0° C.

This mixture was kept at 4° C. for 24 hours and at 18° C. for 20 days. After filtering and dialysing against demiwater until the wash water had a conductivity of 50 μS/cm, the solids content was 5.69%. The degree of carboxymethylation was found to be 85 mol % on the basis of element analysis.

In addition, the ampholytic polymers used can be those polymers which contain "ion pair" comonomer combinations as repeating units; see pages 516–521 of the abovementioned encyclopaedia (loc. cit.). In this case one monomer contains an anionic group such as a sulphonate or carboxylate group and the other monomer contains a cationic group such as a quaternary ammonium group. Examples of such "ion pair" comonomer combinations are, for example, 4-vinylpyridinium/p-styrenesulphonate and 4-vinyl-N-methylpyridinium/p-styrenesulphonate.

With regard to the structure of the ampholytic polymer which can be used according to the invention it is pointed out that the ampholytic groups or blocks can be randomly distributed over the polymer. The "non-ampholytic" part of the polymer, which may be present, can be formed by polymer fragments derived from generally customary monomers such as (meth)acrylic esters, styrene and the like.

The number of milliequivalents (meq) of anionic or cationic groups is advantageously 1–10 meq/g of polymer for each type of group in the ampholytic polymer. It is also pointed out that, in addition to the anionic and cationic groups, the ampholytic polymer can also optionally contain reactive groups, that is to say groups which are reactive with respect to the reactive groups of, for example, the polyfunctional crosslinking agent. Such reactive groups can be, inter alia, primary or secondary amino groups. As a result of this it would then be possible for the ampholytic polymer to be covalently bonded to the thin film formed between, for example, on the one hand a polyamine and on the other hand a polyfunctional crosslinking agent, such as a diacyl or triacyl halide or diisocyanate or triisocyanate compound. Since the ampholytic polymer in principle does not have to make any contribution to the degree of crosslinking itself, the number of reactive groups in the ampholytic polymer can be small, for example less than 0.1 meq of reactive amino groups/gram of ampholytic polymer. However, the ampholytic polymer preferably contains no reactive groups, since such reactive groups impose a restriction on the usable group of polymers. In this context reference is made, for example, to polymers of the abovementioned sulphobetaine and carboxybetaine type, which can no longer be formed, or can hardly be formed if additional reactive groups are present in the monomer.

It can be deduced from the above that the ampholytic polymer advantageously does not constitute a "bonded" part of the polymer network but, on the contrary, is present in the polymer network in the "unbonded" state.

The use of the ampholytic polymers according to the invention has the advantage that, by means of adjustment of the desired charge density of the anionic and cationic charge carriers and of the amount of the ampholytic polymer present in the membrane, the retention characteristics fop monovalent and polyvalent salts relative to organic substances having a molecular weight of, for example, >150 can be adjusted in an optimum manner and the flow becomes appreciably greater if an ampholytic polymer is used. Advantageously, the amount of the ampholytic polymer in the polymer film can be 20–95,for example 60–90, % by weight, calculated on the total weight of the film. As stated, the charge density of both the anionic and the cationic groups is 1–10 meq/g of ampholytic polymer. Data in respect of the abovementioned possibilities are illustrated specifically in mope detail in the examples below.

The ampholytic polymers are usually used in a concentration of about 0.5–10% by weight, in particular about 1–5% by weight, in the aqueous phase, in which the polyamine component is also present.

The materials and methods known from the prior aft, which are explained briefly below, ape suitable fop the preparation of the composite membranes themselves.

According to a large number of known methods of preparation of a top layer of a composite membrane, a polymer solution is first applied to a porous support layer by means of dipping, spraying, doctor blade coating or roller coating oF using a spreader knife, after which the polymer applied is crosslinked by heating, UV radiation, electron radiation or photochemically (Derwent Abstr. 87-247911 (35) and Chem. Abstr. 107(22): 199858s). This type of preparation can be used both for plane and hollow fibre-shaped support membranes (Chem. Abstr. 105(16): 140450h). Within the framework of the invention, an ampholytic polymer is added to the polymer solution.

According to a second type of method of preparation, a polymer solution is cast onto the surface of a liquid, the solvent in the polymer solution mixing with the liquid onto which the polymer solution is cast but the polymer itself not dissolving in this liquid. The polymer layer thus formed can be applied to a support material. Water is often used as the "non-solvent" (Chem. Abstr. 105(10): 81340×and Derwent Abstr. 87-137896 [20]). The ampholytic polymer, which is used according to the invention, must be of a water-insoluble type.

According to a third type of method of preparation, two reactive components can be mixed with one another and the mixture applied by roller coating or spraying to a support material before the reaction has gone to completion (Derwent Abstr. 87-309413 [44]). In this case, the ampholytic polymer can be one of the reactive components or can be added as a non-reactive component to the mixture.

Top layers can also be applied by first applying an aqueous catalyst solution, for a crosslinking reaction (Derwent Abstr. 86-040137[06]) or an initiator, for a polymerisation (Derwent Abstr. 86-116545[18], to a support substrate. If a catalyst is used, the crosslinkable component is applied from a liquid which is immiscible with water. If an initiator is applied to the surface, the monomer to be polymerised is supplied from an aerosol. In top layers of this type, an ampholytic polymer can be incorporated by mixing an inert ampholytic polymer with the crosslinking or polymerising components, by incorporating crosslinking groups in the ampholytic polymer or by including ampholytic monomers in the formulation.

Preferably, the composite membranes are formed by an interfacial polymerisation, on the surface of a microporous support, of (a) a water-soluble polyamine and (b) a polyfunctional crosslinking agent, in the presence of the ampholytic polymer to be used according to the invention. Polyamine compounds which may be mentioned are water-soluble, polyfunctional compounds containing at least two sunino groups which are reactive with acyl halides and/or isocyanate groups. Examples of such reactive amino groups are primary and secondary amino groups. Although it is possible to use polymer or oligomer polyamines, the polyamine is advantageously essentially used in the form of the monomer. Preferably, the polyamine compound is used in a concentration in a range of about 0.05-5% by weight, preferably about 0.1-2% by weight. Examples of polyfunctional amines are, for example, amines of aliphatic or cycloaliphatic nature. More particularly, examples which may be mentioned are piperazine, substituted piperazine containing two reactive amino groups, a cyclohexane compound containing at least two reactive amino or aminoalkyl groups or a piperidine containing at least one reactive amino or aminoalkyl group. Examples of such compounds are 2-methylpiperazine, 2,5-dimethylpiperazine, 1,3-cyclohexane-bis(methylamine), 1,2-diaminocyclohexane, 1,3-diaminocyclohexane, 4-aminopiperidine, 3-aminopiperidine, bipiperidine and 1,4-diaminocyclohexane, N,N'-Dialkyl-substituted alkylenediamines, straight-chain and branched poly(ethylenimines) and aromatic amines such as phenylenediamine may also be mentioned. Mixtures of the above-mentioned polyamines may also be used.

The term "water-soluble" denotes that the polyamine has a solubility in water of $>0.1\%$ by weight, preferably $>1\%$ by weight, under standard conditions ($P=1$ atm. and $T=21°$ C.). In this context it is pointed out that the aqueous solution containing the polyamine can optionally contain co-solvents or other agents improving the solubility.

The polyfunctional crosslinking agents used can be polyfunctional acyl halides. Examples of such acyl halides are triacyl halides and diacyl halides, and also mixtures thereof. If a polyamine is trifunctional or has a higher functionality, a diacyl halide is advantageously used. The term "halide" is usually understood to mean a chloride or bromide. In addition to aliphatic acyl halides, aromatic acyl halides can also be used. Trimesoyl chloride, isophthaloyl chloride, terephthaloyl chloride, 3-chlorosulphonylisophthaloyl chloride and pyromellitic acid chloride are preferably used. Advantageously, the acyl halide is soluble to an appreciable extent in an organic solvent which is immiscible with water (miscibility $<1\%$ by weight, preferably $<0.1\%$ by weight). Suitable solvents for the acyl halides comprise aliphatic and cycloaliphatic hydrocarbons having 5-8 carbon atoms, such as hexane, heptane, octane, cyclopentane, cyclohexane and petroleum ether, as well as halogenated, aliphatic compounds having 1-3 carbon atoms, such as dichloromethane, chloroform and tetrachloroethane. Usually, the acyl halide is present in the organic solution in an amount of 0.02-5% by weight, preferably 0.1-3% by weight.

Since hydrogen chloride is liberated on the formation of a polyamide from, for example, an amine and an acyl chloride, an acid acceptor is advantageously used in the aqueous solution. Suitable acceptors are sodium hydroxide, sodium carbonate or tertiary amines such as triethylamine and N,N'-dimethylpiperazine. The acid acceptor is advantageously present in excess relative to the acid to be formed. If an excess of polyamine is used, this compound can also act as acid acceptor. Usually, the acid acceptor is used in a concentration of about 0.05-5% by weight, preferably 1-2% by weight.

Other polyfunctional crosslinking agents are compounds having at least two sulphonyl halide, carboxylic acid anhydride or sulphonic acid anhydride groups and compounds which are derived from carboxylic acids or sulphonic acids and have a reactivity equal to the halide and carboxylic acid anhydride, as described in U.S. Pat. No. 4,360,434.

Polyfunctional crosslinking agents of another type which may be mentioned are the polyisocyanate and polyisothiocyanate compounds. These compounds, which can be of aliphatic, cycloaliphatic or aromatic nature, contain at least two isocyanate or isothiocyanate groups. Examples of polyisocyanates are the toluene diisocyanates, such as 2,4-diisocyanatotoluene.

As microporous supports onto which the composite membrane is applied supports made of poly-sulphone, chlorinated polyvinyl chloride, polyether sulphone, polyvinylidene fluoride, styrene/acrylonitrile copolymers, cellulose esters and the like are mentioned. Advantageously, however, polysulphone substrates are used; the preparation of such porous substrates is described in U.S. Pat. Nos. 3,926,798, 4,039,440 and 4,277,344. The porosity of the microporous support is advantageously as large as possible while retaining the desired physical strength. Usually, the porous support has a porosity in the range of 50-80% by volume. Preferably, the support is of asymmetric porosity and has a denser region at the side on which the composite membrane is deposited. The average pore diameter of the pores at the surface of the microporous support, onto which the membrane is deposited, is in the range of about 15-5000 Å, preferably about 50-1000 Å.

Advantageously, the method according to the invention, in which the "interfacial polymerisation" described above is used, is in general carried out as follows.

The microporous support is brought into contact with an aqueous solution of, on the one hand, the polyamine and, on the other hand, the ampholytic polymer. This bringing into contact of the aqueous solution with the support can be carried out in a conventional manner, such as by immersion of the support in the aqueous solution or by spraying the aqueous solution onto the support. Usually, the microporous support is immersed in the aqueous solution of the polyamine and the ampholytic polymer. In addition to the polyamine and the ampholytic polymer, the aqueous solution can contain a surface-active substance in order to lower the surface tension during coating or impregnation of the porous support, and also a reagent for neutralising any by-products, for example the acid acceptor NaOH for neutralising the hydrogen chloride which is liberated during the subsequent crosslinking reaction with an acyl chloride. An acid acceptor of this type, such as NaOH, is also added in order to keep the amines in reactive form and to prevent these adopting the less active ammonium form. The excess aqueous solution is removed by holding the support vertically or by any other means known from the prior art. In this context it is pointed out that the support substrate can be in any suitable form, such as a plane plate, a hollow fibre or a tubular structure.

The reaction between the polyamine and the polyfunctional crosslinking agent, such as the acyl halide or polyisocyanate, can be carried out under conventional conditions with regard to the interfacial reaction between a polyamine and a polyfunctional crosslinking agent. In this case the polyfunctional crosslinking agent is used in the form of a solution in an organic solvent, which is virtually insoluble in the aqueous solution.

The polyfunctional crosslinking agent and the polyamine will usually undergo a reaction in the temperature range of 0°–50° C. The reaction usually takes place at ambient temperature, that is to say 10°–30° C., and under atmospheric pressure.

The reaction between the polyfunctional crosslinking agent and the polyamine usually proceeds rapidly. A reaction time of about 0.1-5 minutes is often sufficient to form the desired thin membrane layer. As the flow through the layer is inversely proportional to the thickness, it is desirable that an extremely thin layer of film without defects is obtained. The composite obtained, which consists of a porous substrate and a film, applied thereon, which usually has a thickness in the range of 0.05-0.5 μm, can then be dried in the air in a temperature range of 20°-120° C. for 1-30 minutes.

The composite membranes according to the invention have s high retention for organic compounds such as sucrose and the like and also a low salt retention for, inter alia, NsCl and sodium sulphate. The membranes in question are particularly suitable for the recovery or concentration of desired chemicals from, inter alia, product streams in the foodstuffs industry etc.

The invention is illustrated in more detail with reference to the following examples; these examples must not be interpreted as restrictive.

The term "retention" is understood to mean the quantity calculated in the following way:

substance retention $X$ (in %) =

$$\left(1 - \frac{\text{concentration of substance } X \text{ in the permeate}}{\text{concentration of substance } X \text{ in the feed}}\right) \times 100$$

EXAMPLE I

A wet tubular support membrane made of polysulphone (WFS 6010 Stork Friesland) was immersed for 15 minutes in an aqueous phase containing 0.5% by weight of $NH_2$—$CH_2CH_2CH_2$—$NH$—$CH_2CH_2$—$NH$—$CH_2CH_2CH_2$—$NH_2$, 1.0% by weight of NaOH, 0.02% by weight of sodium dodecyl sulphate and 2.0% by weight of an ampholytic polymer. This polymer was obtained from polyethylenimine (molar weight 30,000-100,000 D) (Janssen, Belgium) by complete methylation and 85 mol % carboxymethylation (7.9 meq/g of anionic and cationic charge carriers in the ampholytic units). The membrane was then removed from the aqueous phase and transferred in the course of about 2 minutes into an organic phase consisting of hexane containing 1.0% by weight of toluene diisocyanate (T-80/Bayer) dissolved therein. The membrane was in the organic phase for 1 minute. The membrane was then dried for 5 minutes at room temperature and then for 15 minutes in a circulating air oven at 90° C. The membrane obtained contained both cationic and anionic groups.

The results of the retention and flow determinations at 25° C. using an aqueous solution which contained 1.0% by weight of sucrose and 0.1% by weight of NaCl are given as a function of the pH in Table A.

TABLE A

| pH | Sucrose retention (%) | NaCl retention (%) | Flow at P = 40 bar (kg.m$^{-2}$.h$^{-1}$) |
|---|---|---|---|
| 3 | 96 | 69 | 99 |
| 5 | 97 | 66 | 100 |
| 7 | 97 | 40 | 98 |
| 9 | 95 | 36 | 99 |
| 11 | 94 | 60 | 115 |

EXAMPLE II

The procedure is as described in Example I. The results of the flow and retention determinations of an aqueous solution containing 1.0% by weight of sucrose and 0.1% by weight of $CaCl_2$ are are given as a function of the pH in Table B.

TABLE B

| pH | Sucrose retention (%) | NaCl$_2$ retention (%) | Flow at P = 40 bar (kg.m$^{-2}$.h$^{-1}$) |
|---|---|---|---|
| 7 | 96 | 83 | 95 |

TABLE B-continued

| pH | Sucrose retention (%) | NaCl$_2$ retention (%) | Flow at P = 40 bar (kg.m$^{-2}$.h$^{-1}$) |
|---|---|---|---|
| 11 | 96 | 34 | 104 |

EXAMPLE III

The procedure is as described in Example I. The results of the flow and retention determinations of an aqueous solution containing 1.0% by weight of sucrose and 0.1% by weight of Na$_2$SO$_4$ at pH=7 are given in Table C.

TABLE C

| Sucrose retention (%) | Na$_2$SO$_4$ retention (%) | Flow at P = 40 bar (kg.m$^{-2}$.h$^{-1}$) |
|---|---|---|
| 97 | 63 | 88 |

EXAMPLE IV

The procedure is as described in Example I. The results of the flow and retention determinations of an aqueous solution containing 1.0% by weight of sucrose and 2.0% by weight of NaCl at pH=5.7 are given in Table D.

TABLE D

| Sucrose retention (%) | NaCl retention (%) | Flow at P = 40 bar (kg.m$^{-2}$.h$^{-1}$) |
|---|---|---|
| 94 | 28 | 95 |

COMPARATIVE EXAMPLE 1

The procedure is as described in Example I. However, the aqueous phase contains no ampholytic polymer. The results of the flow and retention determinations of an aqueous solution containing 1.0% by weight of sucrose and 0.1% by weight of NaCl are given as a function of the pH in Table E.

TABLE E

| pH | Sucrose retention (%) | NaCl retention (%) | Flow at P = 40 bar (kg.m$^{-2}$.h$^{-1}$) |
|---|---|---|---|
| 3 | 97 | 83 | 33 |
| 5 | 97 | 74 | 33 |
| 7 | 97 | 70 | 37 |
| 9 | 97 | 69 | 37 |
| 11 | 96 | 77 | 41 |

Comparison of the results for Example I and for this example shows that the ampholytic polymer has a substantial influence on both the NaCl retention and the flow.

EXAMPLE V

The procedure is as described in Example I. The polyethylenimine used in this example was completely methylated and 87 mol % carboxymethylated. The aqueous phase contained 0.2% by weight of NH$_2$—CH$_2$CH$_2$CH$_2$—NH—CH$_2$CH$_2$—NH—CH$_2$CH$_2$CH$_2$—NH$_2$. The results of the flow and retention determinations of an aqueous solution containing 1.0% by weight of sucrose and 0.1% by weight of NaCl are given as a function of the pH in Table F.

TABLE F

| pH | Sucrose retention (%) | NaCl retention (%) | Flow at P = 40 bar (kg.m$^{-2}$.h$^{-1}$) |
|---|---|---|---|
| 3 | 93 | 49 | 91 |
| 5 | 93 | 31 | 96 |
| 7 | 92 | 23 | 101 |
| 9 | 91 | 31 | 107 |
| 11 | 83 | 63 | 150 |

EXAMPLE VI

The procedure is as described in Example V. The results of the flow and retention determinations of an aqueous solution containing 1.0% by weight of sucrose and various NaCl concentrations at pH=7 are given in Table G.

TABLE G

| NaCl (% by wt.) | Sucrose retention (%) | NaCl retention (%) | Flow at P = 40 bar (kg.m$^{-2}$.h$^{-1}$) |
|---|---|---|---|
| 0.1 | 93 | 24 | 100 |
| 1.0 | 95 | 28 | 94 |
| 3.0 | 94 | 26 | 88 |
| 5.0 | 92 | 19 | 82 |
| 10.0 | 89 | 13 | 65 |

COMPARATIVE EXAMPLE 2

84.5 g of vinylacetamide (VMAcm) were introduced into a 1 l flask under an N$_2$ atmosphere and at 65° C., after which 83.8 g of methyl acrylate (MA) were added in the course of 65 minutes, with polymerisation taking place (molar ratio VMAcm: MA=0.42: 0.58). The copolymer obtained was then hydrolysed for 72 hours at 96° C. in 3 molar HCl to give the vinylacetamide (VMAcm)/vinylmethylamine (VMAm)/acrylic acid (AA)copolymer having a VMAcm:VMAm:AA molar ratio of 0.18:0.24:0.58,and worked up (neutralisation with hydroxide solution, dialysing against deionised water and freeze-drying).

A tubular support membrane made of polysulphone (WFS 6010 Stork Friesland) was then immersed for 15 minutes at 25° C. in an aqueous phase containing 1% by weight of the abovementioned copolymer, after which the support membrane was treated using 1.8% by weight of isophthaloyl chloride (IPC; distilled) in the hexane phase at 25° C. for 1 minute. The membrane obtained was then dried at 25° C. for 5 minutes, after which the drying treatment was continued for 15 minutes in a circulating air oven at 90° C.

The ampholytic copolymer prepared contained 6.7 meq/g of anionic groups and 2.8 meq/g of cationic charge carriers in a "random" distribution; this "random" distribution leads to a poor reproducibility of the membrane characteristics of the ampholytic copolymers formed, as can be seen from the results below.

The results of retention and flow determinations carried out at 25° C. using an aqueous solution which contained 1% by weight of sucrose, 1% by weight of glucose and 0.1% by weight of NaCl are given in Table H below for a first series of membranes produced in the above manner.

TABLE H

| Membrane | NaCl retention (%) | Glucose retention (%) | Sucrose retention (%) | Flow at P = 40 bar (kg.m$^{-2}$.h$^{-1}$) |
|---|---|---|---|---|
| 1 | 26.3 | 65.6 | 83.4 | 48 |

TABLE H-continued

| Membrane | NaCl retention (%) | Glucose retention (%) | Sucrose retention (%) | Flow at P = 40 bar (kg.m$^{-2}$.h$^{-1}$) |
| --- | --- | --- | --- | --- |
| 2 | 24.3 | 67.0 | 85.7 | 52 |
| 3 | 19.3 | 61.5 | 81.6 | 61 |

A second series of membranes was produced in the manner described above but using a new IPC solution in hexane (1.8% by weight). The results of the abovementioned determinations in respect of the second series of membranes are given in Table I below.

TABLE I

| Membrane | NaCl retention (%) | Glucose retention (%) | Sucrose retention (%) | Flow at P = 40 bar (kg.m$^{-2}$.h$^{-1}$) |
| --- | --- | --- | --- | --- |
| 4 | 55.6 | 34.8 | 52.8 | 91 |
| 5 | 47.3 | 28.6 | 38.4 | 154 |

As can be seen from the above Tables H and I, the membranes of the first and the second series have great differences in characteristics.

A third series of membranes was produced in the manner described above, except that both a new aqueous phase containing 1% by weight of the same copolymer and a new hexane phase (containing 1.8% by weight of IPC) were used. The results of the abovementioned determinations in respect of the third series of membranes are given in Table J below.

TABLE J

| Membrane | NaCl retention (%) | Glucose retention (%) | Sucrose retention (%) | Flow at P = 40 bar (kg.m$^{-2}$.h$^{-1}$) |
| --- | --- | --- | --- | --- |
| 6 | 53.1 | 43.3 | 63.9 | 80 |
| 7 | 55.3 | 45.3 | 65.3 | 71 |
| 8 | 56.1 | 46.0 | 71.9 | 53 |

The results given in Table J deviate appreciably from the results given in Tables H and I. It can be concluded that the reproducibility of the membranes produced is poor, which can be ascribed to the "random" distribution of the ampholytic groups in the copolymer. Because of this "random" distribution, the polymer can always adopt a different conformation in the aqueous phase, which leads to a different charge condition in the membrane.

The above problem with regard to the reproducibility of membrane characteristics can be eliminated with the aid of the invention by incorporating the ampholytes (that is to say the anionic and cationic charge carriers) in so-called "repeating" units in the ampholytic polymer.

We claim:

1. Semipermeable composite membrane having a high sucrose retention and a low salt retention, comprising a porous support substrate and a polymer film applied to the support and comprising ampholytic groups, wherein the polymer film is formed from film forming reagents and contains ampholytic polymer in an amount of about 20–95% by weight of the polymer film, wherein the ampholytic polymer comprises repeating units containing at least one anionic group and at least one cationic group and no group reactive to the film forming reagents, whereby the ampholytic polymer is present in the polymer in an unbonded state.

2. Semipermeable membrane according to claim 1, characterised in that the ampholytic polymer contains repeating units containing both at least one carboxylate and/or sulphonate group and at least one quaternary ammonium group and/or sulphonium group.

3. Semipermeable composite membrane according to claim 1, characterised in that the ampholytic polymer contains repeating units derived from monomers containing both at least one anionic and at least one cationic group.

4. Semipermeable composite membrane according to claim 3, characterised in that the ampholytic polymer contains repeating units of the sulphobetaine type or the carboxybetaine type.

5. Semipermeable composite membrane according to claim 4, characterised in that the repeating units of the sulphobetaine type are derived from the inner salt of a vinyl-(sulpho-R-)-imidazolium hydroxide or vinyl-(sulpho-R-)-pyridinium hydroxide, in which R represents a C$_{3-4}$ alkyl group or a benzyl group.

6. Semipermeable membrane according to claim 1, characterised in that the ampholytic polymer contains repeating units having one or more of the formulae 1–4

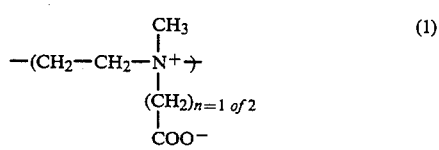

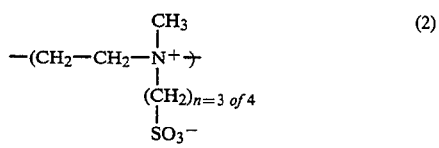

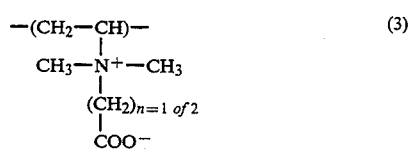

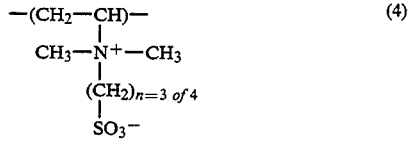

7. Semipermeable membrane according to claim 1, characterised in that the ampholytic polymer contains repeating units having the formula

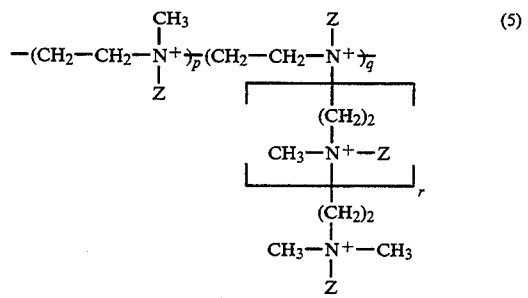

in which Z=H, —CH$_2$COO—, —(CH$_2$)$_2$COO—, —(CH$_2$)$_3$SO$_3$— and/or —(CH$_2$)$_4$SO$_3$—, on condition that not all Z=H and the sum of $p+r+2q=1$, the sum of $p+r=0.5-1$ and $2q$ has a value of 0.5-0.

8. Semipermeable membrane according to claim 1, characterised in that the ampholytic polymer contains repeating units of the "ion pair" comonomer type.

9. Semipermeable membrane according to claim 8, characterised in that the ampholytic polymer contains repeating units of the "ion pair" comonomers 4-vinyl-pyridinium/p-styrenesulphonate and/or 4-vinyl-N-methylpyridinium/p-styrenesulphonate.

10. Semipermeable membrane according to claim 1, characterised in that the ampholytic polymer contains 1-10 meq/g of anionic groups and 1-10 meq/g of cationic groups.

11. Semipermeable composite according to claim 1, wherein the ampholytic polymer is present in an amount of about 60-90% by weight of the polymer film.

* * * * *